US012789812B2

(12) United States Patent
Einstoss et al.

(10) Patent No.: US 12,789,812 B2
(45) Date of Patent: Nov. 10, 2026

(54) HANDLING TRACTION CONTROL OF A VEHICLE

(71) Applicant: VOLVO TRUCK CORPORATION, Gothenburg (SE)

(72) Inventors: Gabriel Einstoss, Greensboro, NC (US); Chidambaram Subramanian, Jamestown, NC (US); Alejandro Correa Field Morales, Greensboro, NC (US)

(73) Assignee: VOLVO TRUCK CORPORATION, Gothenburg (SE)

( * ) Notice: Subject to any disclaimer, the term of this patent is extended or adjusted under 35 U.S.C. 154(b) by 61 days.

(21) Appl. No.: 18/828,618

(22) Filed: Sep. 9, 2024

(65) Prior Publication Data

US 2026/0070556 A1 Mar. 12, 2026

(51) Int. Cl.

*B60W 30/18* (2012.01)
*B60W 10/16* (2012.01)
*B60W 10/184* (2012.01)

(52) U.S. Cl.

CPC ...... *B60W 30/18172* (2013.01); *B60W 10/16* (2013.01); *B60W 10/184* (2013.01); *B60W 2520/26* (2013.01); *B60W 2552/40* (2020.02); *B60W 2710/125* (2013.01)

(58) Field of Classification Search

CPC ........... B60W 30/18172; B60W 10/16; B60W 10/184; B60W 2520/26; B60W 2552/40; B60W 2710/125
USPC ........................................................... 701/82
See application file for complete search history.

(56) References Cited

U.S. PATENT DOCUMENTS

2021/0284127 A1 9/2021 McKeown et al.
2024/0001932 A1 1/2024 Birch et al.

FOREIGN PATENT DOCUMENTS

KR 20240025781 A * 2/2024 ............. B60T 8/171
WO 2018166862 A1 9/2018

OTHER PUBLICATIONS

Extended European Search Report dated Feb. 2, 2026 in corresponding European Patent Application No. 25200400.7, 8 pages.

* cited by examiner

*Primary Examiner* — Lindsay M Low
*Assistant Examiner* — Omar Morales
(74) *Attorney, Agent, or Firm* — Jeffri A. Kaminski; Venable LLP

(57) ABSTRACT

A computer system has processing circuitry configured to handle traction control of a vehicle operating on a surface area is provided. The processing circuitry obtains wheel information indicative of a motion of at least one wheel of the vehicle. The processing circuitry is configured to, based on the obtained wheel information, determine the surface area to be of a surface area type out of a set of surface area types. The processing circuitry is configured to, based on the surface area type, determine a traction control procedure of the vehicle. The traction control procedure comprises a brake control procedure, a differential locking procedure, or a blend of the brake control procedure and the differential locking procedure. The processing circuitry triggers the vehicle to perform the determined traction control procedure.

19 Claims, 5 Drawing Sheets

HANDLING TRACTION CONTROL OF A VEHICLE

TECHNICAL FIELD

The disclosure relates generally to vehicle control. In particular aspects, the disclosure relates to handling traction control of a vehicle. The disclosure can be applied to heavy-duty vehicles, such as trucks, buses, and construction equipment, among other vehicle types. Although the disclosure may be described with respect to a particular vehicle, the disclosure is not restricted to any particular vehicle.

BACKGROUND

When operating in slippery conditions, to gain or maintain traction, a vehicle typically utilizes differential locks for locking one or more axles to rotate with the same speed, or utilizes traction control by a brake control procedure where a spinning wheel is locked by braking the spinning wheel and where torque is transferred to the wheel on the opposite side of the axle of the spinning wheel.

While both procedures can achieve increased traction of a vehicle, utilizing the wrong procedure in the wrong situation may fail to gain traction and may instead degrade vehicle control. For example, in some situations, if locking a wheel in when the wheel is slipping in mud, the locked wheel may be dragged along the mud and build up mud in front of the wheel and vehicle which will make it difficult for the vehicle to operate due to the mud build up. Other corresponding problems appear if utilizing the wrong traction control procedure in the situation. Hence, there is a strive to improve handling of traction in vehicles.

SUMMARY

According to a first aspect of the disclosure, a computer system comprising processing circuitry configured to handle traction control of a vehicle operating on a surface area is provided. The processing circuitry is configured to obtain wheel information indicative of a motion of at least one wheel of the vehicle operating on the surface area.

The surface area is preferably associated with a friction coefficient below a threshold, such that the at least one wheel of the vehicle is spinning on the surface area or is at risk of spinning on at least part of the surface area.

The processing circuitry is configured to obtain the wheel information from one or more sensors of the vehicle and/or from a Controller Area Network (CAN) of the vehicle.

The processing circuitry is configured to, based on the obtained wheel information, determine the surface area to be of a surface area type out of a set of surface area types.

The processing circuitry is configured to determine a traction control procedure of the vehicle based on the surface area type.

The traction control procedure comprises a brake control procedure, a differential locking procedure, or a blend of the brake control procedure and the differential locking procedure. The brake control procedure comprises applying a brake force to a slipping wheel of the vehicle. The differential locking procedure comprises locking a differential of an axle of a slipping wheel of the vehicle.

The processing circuitry is configured to trigger the vehicle to perform the determined traction control procedure.

The first aspect of the disclosure may seek to improve handling traction of the vehicle. A technical benefit may include improved traction of the vehicle. This is since a traction control procedure may be determined based on the identified surface area type such that the traction control procedure is effective for gaining or maintaining traction on said surface area type.

For example, if using only the brake control procedure would relate to building up materials in front of the vehicle with respect to the surface area type, the differential locking procedure can be used, or the blend of the different procedures may be used. If using only the differential locking procedure would relate to still having the at least one wheel spinning with respect to the surface area type, the brake control procedure can instead be used, or the blend of the different procedures may be used.

In other words, using the first aspect as discussed above, the vehicle will use an efficient traction control procedure adapted to the surface area type and can thereby gain or maintain traction when friction is low.

Optionally in some examples, including in at least one preferred example, the processing circuitry is configured to obtain vehicle status information from the one or more sensors of the vehicle and/or from the CAN of the vehicle. In these examples, the vehicle status information being indicative of any one or more of:

- a motion of the vehicle,
- environmental data of the surface area and/or the vehicle,
- load applied to one or more axles of the vehicle,
- steering information of the vehicle,
- characteristics of the vehicle, or
- user input.

In these examples, the processing circuitry is configured to determine the traction control procedure based on the obtained vehicle status information.

A technical benefit may include improved traction control of the vehicle. This is since the different vehicle status information may, in combination with the surface area type, require different traction control procedures to achieve more efficient traction. Hence, by considering the vehicle status information and the surface area type, the traction control procedure can be determined to achieve increased traction and more efficient vehicle control.

Optionally in some examples, including in at least one preferred example, the processing circuitry is configured to determine the traction control procedure based on a machine learning model.

In these examples, the machine learning model is trained based on one or more training vehicles using the brake control procedure, the differential locking procedure, or a blend of the brake control procedure and the differential locking procedure when a respective wheel of a respective training vehicle is slipping in a respective surface area type of the set of surface area types.

In these examples, the machine learning model is trained on the corresponding outcome of whether the respective training vehicle was successful or unsuccessful in gaining traction of the respective slipping wheel.

A technical benefit may include improved traction control of the vehicle. This is since when the machine learning model is used for determining the traction control procedure, determining the traction control procedure may effectively determine the traction control procedure by considering a vast number of different conditions and traction control procedures and how they were handled to be successful or not successful in gaining traction of a respective slipping wheel. Utilizing the training data, the machine learning model may effectively determine a traction control procedure which is likely to succeed in gaining or maintaining of the at least one wheel.

Optionally in some examples, including in at least one preferred example, the machine learning model is a reinforcement learning model. In these examples, the processing circuitry is further configured to determine whether or not using the traction control procedure on the surface area is successful or unsuccessful in gaining or maintaining traction of the at least one wheel of the vehicle. In these examples, the machine learning model is trained on whether or not the traction control procedure was successful or unsuccessful in gaining traction of the at least one wheel of the vehicle.

A technical benefit may include improved traction control of the vehicle. This is since the machine learning model may learn the behavior of the vehicle using the different traction control procedures on the different surface area types and which is proven to be effective.

Optionally in some examples, including in at least one preferred example, the machine learning model is further trained on vehicle status information indicative of any one or more of:

a motion of the vehicle,
environmental data of the surface area and/or the vehicle,
load applied to one or more axles of the vehicle,
steering information of the vehicle,
characteristics of the vehicle, or
user input.

A technical benefit may include improved traction control of the vehicle. This is since the various optional parameters as above may have an effect on whether the traction control procedure is successful and may be useful to more efficiently determine an efficient traction control procedure for future situations. For example, the motion of the vehicle may change which traction control procedure is best to use on a certain surface area type.

Optionally in some examples, including in at least one preferred example, the processing circuitry is configured to determine the surface area type based on determining a current slip of the at least one wheel of the vehicle and mapping the current slip to the surface area type.

A technical benefit may include improved traction control of the vehicle. This is since increased accuracy in determining the surface area type will consequently increase the effectiveness of the traction control procedure determined for said surface area type.

Optionally in some examples, including in at least one preferred example, the wheel information comprises accelerometer data of the at least one wheel. In these examples, the processing circuitry is configured to determine the surface area type based on the accelerometer data.

A technical benefit may include improved traction control of the vehicle. This is since when using accelerometer data, the surface area type may more accurately be determined.

Optionally in some examples, including in at least one preferred example, the set of surface area types comprises a smooth surface area type. The smooth surface area type may relate to a set of selected surface areas or may relate to a roughness parameter value being below a threshold such as considering a profile roughness parameters or area roughness parameters. The smooth surface area type may comprise or represent any of: ice, water, liquid, oil, wet concrete or asphalt, or any smooth surface area type associated with a friction coefficient below a threshold. The smooth surface area type is not coarse grained and may not have any (or only a limited amount of) coarse grained material on top of it e.g., mud etc.

A technical benefit may include improved traction control of the vehicle. This is since the traction control procedure can be set for a broad type of surface area which often share same properties in terms of traction control. For example, for smooth types of surface areas, there may be a risk that a wheel continues to slip when only utilizing differential locking procedures to gain traction.

Optionally in some examples, including in at least one preferred example, the set of surface area types comprises a coarse grained surface area type. The coarse grained surface area type may be the area types which are not smooth surface area types as defined above. Alternatively the coarse grained surface area type may be related to a set of selected surface areas or may relate to a roughness parameter value being above a threshold such as considering a profile roughness parameters or area roughness parameters. The coarse grained surface area type may comprise or represent any of: mud, snow, sand, gravel, loose materials, or any coarse surface area type associated with a friction coefficient below a threshold.

A technical benefit may include improved traction control of the vehicle. This is since the traction control procedure can be set for a broad type of surface area which often share same properties in terms of traction control. For example, for coarse grained surface area types there may be a risk of pushing the coarse grained material in front of the wheel and vehicle when only utilizing the brake control procedure for gaining traction.

Optionally in some examples, including in at least one preferred example, the blend of the brake control procedure and the differential locking procedure comprises a sequence of switching between performing the brake control procedure and the differential locking procedure.

A technical benefit may include improved traction control of the vehicle. This is since switching between the two different traction control procedures may in some situations be more effective to gain traction of the vehicle than using only a single traction control procedure. The blend or switching may be determined based on the surface area type and optionally any of the vehicle status information as discussed above. Preferably, the blend may be determined based on a machine learning model which have learnt that said blend is effective.

According to a second aspect of the disclosure, a vehicle is provided. The vehicle comprises, or is controlled by, a computer system according to the first aspect.

According to a third aspect of the disclosure, a computer-implemented method for handling traction control of a vehicle operating on a surface area is provided.

The method comprises: by processing circuitry of a computer system, obtaining wheel information indicative of a motion of at least one wheel of the vehicle operating on the surface area. The wheel information is obtained from one or more sensors of the vehicle and/or from a Controller Area Network (CAN) of the vehicle.

The method comprises: by the processing circuitry, based on the obtained wheel information, determining the surface area to be of a surface area type out of a set of surface area types.

The method comprises: by the processing circuitry, based on the surface area type, determining a traction control procedure of the vehicle. The traction control procedure comprises a brake control procedure, a differential locking procedure, or a blend of the brake control procedure and the differential locking procedure.

The brake control procedure comprises applying a brake force to a slipping wheel of the vehicle.

The differential locking procedure comprises locking a differential of an axle of a slipping wheel of the vehicle.

The method comprises: by the processing circuitry, triggering the vehicle to perform the determined traction control procedure.

Optionally in some examples, including in at least one preferred example, the method comprises: obtaining vehicle status information from the one or more sensors of the vehicle and/or from the CAN of the vehicle. In these examples, the vehicle status information being indicative of any one or more of:

a motion of the vehicle,
environmental data of the surface area and/or the vehicle,
load applied to one or more axles of the vehicle,
steering information of the vehicle,
characteristics of the vehicle, or
user input.

In these examples, the method further comprises determining the traction control procedure based on the obtained vehicle status information.

Optionally in some examples, including in at least one preferred example, the method comprises: determining the traction control procedure based on a machine learning model. The machine learning model is trained based on one or more training vehicles using the brake control procedure, the differential locking procedure, or a blend of the brake control procedure and the differential locking procedure when a respective wheel of a respective training vehicle is slipping in a respective surface area type of the set of surface area types. In these examples, the machine learning model is trained on the corresponding outcome of whether the respective training vehicle was successful or unsuccessful in gaining traction of the respective slipping wheel.

Optionally in some examples, including in at least one preferred example, the machine learning model is a reinforcement learning model. In these examples, the method further comprises determining whether or not using the traction control procedure on the surface area is successful or unsuccessful in gaining or maintaining traction of the at least one wheel of the vehicle.

In some of these examples, the method further comprises training the machine learning model based on whether or not the traction control procedure was successful or unsuccessful in gaining traction of the at least one wheel of the vehicle.

Optionally in some examples, including in at least one preferred example, the machine learning model is further trained on vehicle status information indicative of any one or more of:

a motion of the vehicle,
environmental data of the surface area and/or the vehicle,
load applied to one or more axles of the vehicle,
steering information of the vehicle,
characteristics of the vehicle, or
user input.

Optionally in some examples, including in at least one preferred example, the method comprises: determining the surface area type based on determining a current slip of the at least one wheel of the vehicle and mapping the current slip to the surface area type.

Optionally in some examples, including in at least one preferred example, the method comprises: determining the surface area type based on accelerometer data. In these examples, the accelerometer data is part of the wheel information.

Optionally in some examples, including in at least one preferred example, the set of surface area types comprises a smooth surface area type, and wherein the set of surface area types comprises a coarse grained surface area type.

The disclosed aspects, examples (including any preferred examples), and/or accompanying claims may be suitably combined with each other as would be apparent to anyone of ordinary skill in the art. Additional features and advantages are disclosed in the following description, claims, and drawings, and in part will be readily apparent therefrom to those skilled in the art or recognized by practicing the disclosure as described herein.

There are also disclosed herein computer systems, control units, code modules, computer-implemented methods, computer readable media, and computer program products associated with the above discussed technical benefits.

BRIEF DESCRIPTION OF THE DRAWINGS

Examples are described in more detail below with reference to the appended drawings.

DETAILED DESCRIPTION

The detailed description set forth below provides information and examples of the disclosed technology with sufficient detail to enable those skilled in the art to practice the disclosure.

Examples herein relate to handling traction of a vehicle by employing a traction control procedure comprising a brake control procedure, a differential locking procedure, or a blend of the brake control procedure and the differential locking procedure.

When differential locks are discussed in examples herein, the differential locks may further relate to or refer to any suitable power divider of a vehicle.

While both differential locking and brake control may be beneficial for gaining traction, they both have their drawbacks and advantages.

As an example, for some situations, if one wheel is stuck spinning in mud or snow or on any coarse grained surface area type, traction control using braking may be used to lock the spinning wheel, and to transfer power to the other side by applying brakes. However, in some situations such a procedure is not helpful if the locked wheel is dragged while the vehicle is moving such that the dragged wheel builds up snow and mud in front of the wheel and vehicle, creating resistance to the vehicle. In these situations, differential locking may need to at least partly be used to gain traction.

As another example, when there is a spinning wheel on ice, if the wheel is locked, it may clearly be possible to transfer power to the other wheel of the same axle which would help to gain traction. In these situations, utilizing differential locking may only reduce traction and brake control may need to be at least partly used to gain traction.

Figure 1:
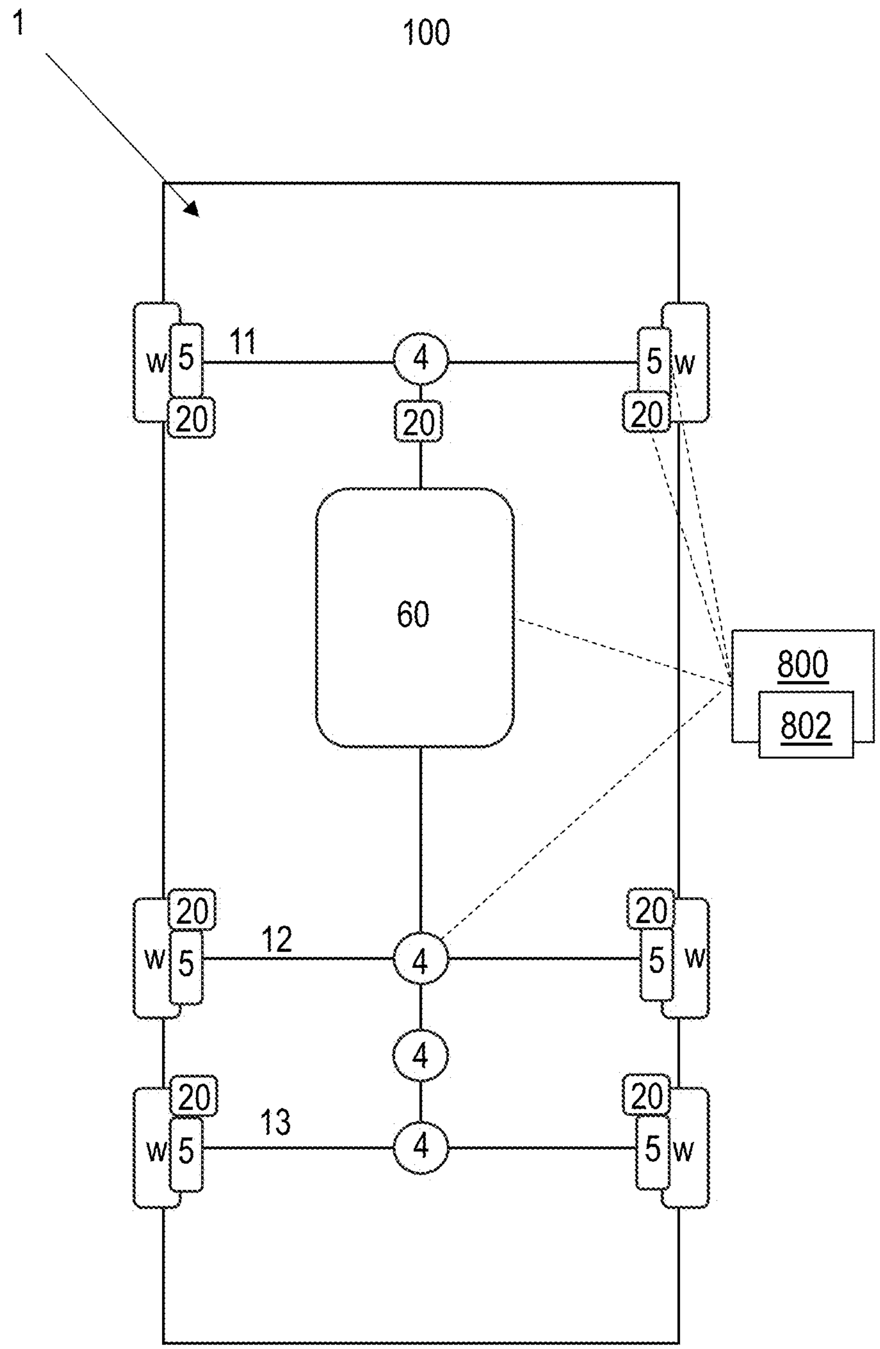
FIG. 1 is an exemplary vehicle according to an example.

FIG. 1 illustrates a vehicle 1 according to some examples herein. The vehicle 1 may be any suitable vehicle which comprises one or more wheels w. The vehicle 1 may for example be a truck, bus, tractor, car, or heavy-duty vehicle. While six wheels are illustrated in FIG. 1, any suitable number of wheels w apply to examples herein.

The vehicle 1 may travel on a surface area 100.

The surface area 100 may be of a surface area type out of a set of surface area types.

The set of surface area types may be predefined, but may also be dynamically determined. The surface area types of the set of surface area types may be distinguishable from each other and each type may relate to a distinct characteristic.

As an example, the set of surface area types may comprise a smooth surface area type. The smooth surface area type may represent ice, of: ice, water, liquid, oil, wet concrete or asphalt, or any smooth surface area type associated with a friction coefficient below a threshold.

The set of surface area types may comprise a coarse grained surface area type.

The coarse grained surface area type may comprise or represent any of: mud, snow, sand, gravel, loose materials, or any coarse surface area type associated with a friction coefficient below a threshold.

The vehicle 1 comprises one or more axles 11, 12, 13, such as a first axle 11, e.g., a steering axle, a second axle 12, e.g., a drive axle, and a third axle 13, e.g., a drive axle.

Each respective wheel w may comprise a respective brake 5, e.g., used for a brake control procedure.

Using a brake control procedure may relate to braking a spinning wheel w, wherein power is transferred to a second wheel w on the same axle. Propulsion may be added to the second wheel. This procedure may be beneficial to gain traction e.g., when the vehicle 1 is on a smooth surface such as that one wheel on one side of an axle may travel on ice and another wheel on the other side of the axle may have good friction on. In these situations, the vehicle 1 may not use a differential locking procedure since that may only result in wheels keeping spinning on the icy side and using half of the power of the vehicle 1 to propel on the high friction side. In such cases, the brake control procedure may apply a respective brake 5 on the low friction icy side and transfer all the power to the high friction side. Even if the wheel operating on the low friction icy side drags due to the brake application, this behavior may be acceptable since the resistance of dragging a wheel on a smooth surface such as ice may be negligible or at least very low, i.e., below a threshold.

The vehicle 1 may comprise one or more differentials 4, e.g., inter-wheel or inter-axle differentials, which may be able to lock axles. When a differential is locked, the respective wheels may share a rotational speed. This may be beneficial to gain traction e.g., when the vehicle 1 is on a coarse surface like mud and/or sand which only digs in deeper as you spin a wheel a lot and where you may have high friction such as normal asphalt for a corresponding wheel of the same axle. Applying the brake to transfer power may provide some traction, but if you have already dug in deeper into the coarse grain material, then the vehicle 1 may apply a brake 5 on the wheel, and thereby create resistance, and end up in dragging that wheel along the coarse surface area and building up a mountain of coarse material in front of the tire causing more resistance. In such scenarios a blend of differential locking procedure to spin the wheel and clear some mud and where some usage of brake control would help. How much of blending in which sequence may in examples herein be determined based on the surface area type, depending on vehicle status information, and preferably be learnt by a machine learning model as part of examples herein.

The vehicle 1 may comprise one or more sensors 20. The one or more sensors 20 may be of any suitable type for measuring any suitable parameter, e.g., slip or accelerometer data of a at least one wheel w of the vehicle 1. In particular, the one or more sensors 20 may comprise one or more sensors for measuring the motion or status of the one or more wheels w. For example, each wheel w may be associated with a respective sensors measuring the respective wheel, e.g., its slip or rotational motion. The one or more sensors 20 may comprise tire sensors comprising an accelerometer respectively attached to respective wheels w and may measure rotational motion of the respective wheel w, i.e., accelerometer data.

The tire sensors may be able to measure and detect rotational motion, contact events, slip, etc. Using accelerometer data of the tire sensors, the surface area type of the surface area 100 may be detectable, in particular when considering the contact event. This is since any contact event, e.g., when a part of the tire of a respective wheel w is in contact with the surface area 100, is longer for coarse grained surfaces than for smooth surfaces. This is since the contact event will start sooner as coarse grained surfaces will be in contact with the respective tire earlier with respect to a revolution of the respective wheel w due to the roughness of the surface.

The one or more sensors 20 may further comprise any other sensors which may measure or detect a motion or status of the vehicle 1 or measure or detect information of the surroundings of the vehicle 1. For example, the one or more sensors 20 may comprise one or more accelerometer(s)/tire sensor(s), or respective strain or position sensor(s).

The vehicle 1 may comprise Controller Area Network (CAN) 60. The CAN 60 may be able to transmit any suitable signals or information of the vehicle status, sensor data, actuation data of actuators, or any suitable signals.

Examples herein may be performed by a computer system 800 and/or a processing circuitry 802 therein.

The computer system 800 and/or the processing circuitry 802 therein may be or may comprise an Electronic Control Unit (ECU) of the vehicle 1.

The computer system 800 and/or the processing circuitry 802 therein may be comprised in the vehicle 1, or may be remote to the vehicle 1, e.g., in a server or as part of a cloud service. In other words, the computer system 800 and/or the processing circuitry 802 therein may be able to remotely control at least part of the vehicle 1.

In other words, the vehicle 1 may comprise and/or may be controlled by the computer system 800.

The computer system 800 and/or the processing circuitry 802 therein may be or may be able to control or communicate with any suitable entity of the vehicle, e.g., the one or more sensors 20, the one or more wheels w, the one or more brakes 5, the one or more differentials 4, the CAN 60, or any other suitable device of the vehicle 1.

Figure 2:
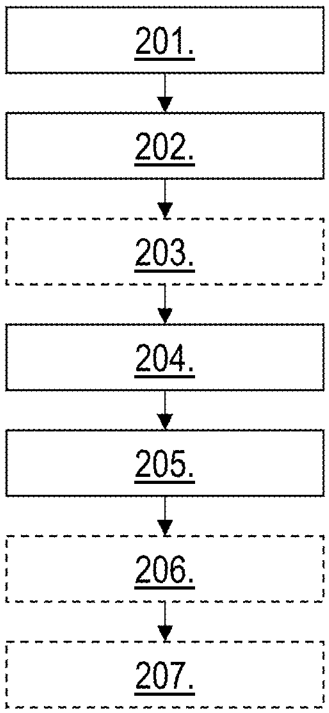
FIG. 2 is a flow chart of an exemplary method according to an example.

FIG. 2 is a flow chart of a computer-implemented method for handling traction control of the vehicle 1 operating on the surface area 100.

The method may be performed by the computer system 800 and/or the processing circuitry therein.

The method comprises the following actions, which actions may be performed in any suitable order.

Action 201

The method comprises obtaining wheel information indicative of a motion of at least one wheel of the vehicle 1 operating on the surface area 100. The at least one wheel may in examples herein be at least one wheel of the one or more wheels w.

The wheel information is obtained from the one or more sensors 20 of the vehicle 1 and/or from the CAN 60 of the vehicle 1.

Action 202

The method comprises, based on the obtained wheel information, determining the surface area 100 to be of a surface area type out of a set of surface area types.

The wheel information may accurately indicate the surface area type of the surface area 100 and any suitable sensor or sensor data may be used.

As an example, the set of surface area types may comprise a smooth surface area type. The smooth surface area type may represent ice, of: ice, water, liquid, oil, wet concrete or asphalt, or any smooth surface area type associated with a friction coefficient below a threshold.

The set of surface area types may comprise a coarse grained surface area type.

The coarse grained surface area type may comprise or represent any of: mud, snow, sand, gravel, loose materials, or any coarse surface area type associated with a friction coefficient below a threshold.

The determination may preferably be based on a predefined model or predefined heuristics such as mapping the wheel information to a set surface area type.

Determining the surface area type may be based on determining a current slip of the at least one wheel w of the vehicle 1 and mapping the current slip to the surface area type.

Additionally or alternatively, determining the surface area type may be based on accelerometer data, in particular when the one or more sensors 20 comprises one or more tire sensors. In these examples the accelerometer data is part of the wheel information. For example, the accelerometer data may describe a wheel and/or tire behavior as the respective wheel and tire moves over the surface area 100. For example, a contact event of a respective tire may indicate the surface area type, e.g., where longer contact events indicate that a bigger part of the tire is in contact with the surface area, indicating a coarse grained surface area type such as mud. Vibrations may further indicate the surface area type.

Action 203

The method may comprise obtaining vehicle status information from the one or more sensors 20 of the vehicle 1 and/or from the CAN 60 of the vehicle 1.

The vehicle status information may be indicative of any one or more of:

- a motion of the vehicle 1, e.g., speed, acceleration, yaw, wheel motion, suspension actuation,
- environmental data of the surface area 100 and/or the vehicle 1, e.g., any one or more out of weather, temperature, pressure, traffic, road condition,
- load applied to one or more axles of the vehicle 1, e.g., any one or more out of load distribution and change thereof,
- steering information of the vehicle 1, e.g., steering angle and/or steering torque,
- characteristics of the vehicle 1, e.g., any one or more out of wheelbase, mass, type, number of units, and/or
- user input, e.g., any one or more out of when to apply traction control, steering input, pedal input.

Action 204

The method comprises determining a traction control procedure of the vehicle 1 based on the surface area type. The traction control procedure comprises a brake control procedure, a differential locking procedure, or a blend of the brake control procedure and the differential locking procedure.

Determining the traction control procedure may comprise selecting which of the brake control procedure, the differential locking procedure, or the blend of the brake control procedure and the differential locking procedure to use, e.g., based on the surface area type. Determining the traction control procedure may comprise determining which of the brake control procedure, the differential locking procedure, or the blend of the brake control procedure and the differential locking procedure is more efficient to use.

Determining the traction control procedure may comprise determining the blend of the brake control procedure and the differential locking procedure by determining a sequence of the brake control procedure and the differential locking procedure for the blend. The blend may comprise a series of respective actions of performing brake control procedure or the differential locking procedure.

The brake control procedure comprises applying a brake force to a slipping wheel of the vehicle 1. The brake control procedure may use a respective brake 5 to brake the slipping wheel.

The differential locking procedure comprises locking a differential 4 of an axle of a slipping wheel of the vehicle 1.

The slipping wheel may be any one or more out of the one or more wheels w. However, to gain traction, typically at least one wheel of the one or more wheels w have higher traction than the other wheels which may be subject to gain traction using the procedures described herein. The slipping wheel may have been detected by use of the wheel information as obtained in Action 201.

Determining the traction control procedure may further be based on the obtained vehicle status information of Action 203. In other words, which traction control to use, or which blend to use, may be determined based on the surface area type and based on the vehicle status information.

Preferably determining the traction control procedure is based on a machine learning model. This is so that multiple parameters, e.g., the vehicle status information of Action 203 may accurately be mapped with the surface area type to the more effective traction control procedure, such as to the more effective blend.

The machine learning model may be trained based on one or more training vehicles using the brake control procedure, the differential locking procedure, or a blend of the brake control procedure and the differential locking procedure when a respective wheel of a respective training vehicle is slipping in a respective surface area type of the set of surface area types. The training may be performed by trying multiple different types of blends of traction control procedures for different vehicles and surface types.

The machine learning model may be trained on the corresponding outcome of whether the respective training vehicle was successful or unsuccessful in gaining traction of the respective slipping wheel. This means that the successful attempts to gain traction may cause the machine learning model to learn which vehicle status information in combination with which surface area types lead to successfully gaining traction and may further use this information to determine the traction control procedure to use for a slipping wheel w of the vehicle 1.

The one or more training vehicles may be any one or more out of simulated vehicles, other vehicles than the vehicle 1, the vehicle 1 itself.

The machine learning model may be reinforcement learning model. This means that a result of using the traction control procedure may be fed back to the machine learning model such that the machine learning model may adapt based on the outcome of the usage of the traction control procedure.

As briefly discussed above, the machine learning model may further be trained on vehicle status information indicative of any one or more of:

a motion of the vehicle 1, environmental data of the surface area 100 and/or the vehicle 1, load applied to one or more axles of the vehicle 1, steering information of the vehicle 1, characteristics of the vehicle 1, or user input.

The vehicle status information may be the information obtained as part of Action 203. The vehicle status information may additionally or alternatively comprise the wheel information as obtained in Action 201.

In other words, the machine learning model may be trained based on any suitable parameters which may be relevant to the vehicle traction, as well as the surface area type of the surface area 100.

In particular, the machine learning model may be trained to be used to find a suitable traction control blend of the brake control procedure and the differential locking procedure based on the surface area type and the vehicle status information.

In some examples, determining the traction control procedure may further comprise determining a procedure duration of performing the traction control procedure.

Action 205

The method comprises triggering the vehicle 1 to perform the determined traction control procedure, i.e., the traction control procedure as determined in Action 204.

Triggering the vehicle 1 to perform the determined traction control procedure may comprise signaling a control unit of the to perform the traction control procedure and/or to control any suitable actuators, e.g., any one or more out of the brakes 5 and/or the one or more differentials 4, to perform the determined traction control procedure.

Triggering the vehicle 1 to perform the determined traction control procedure may comprise triggering the vehicle 1 to perform the determined traction control procedure for the determined procedure duration.

Action 206

The method may comprise determining whether or not using the traction control procedure on the surface area 100 is successful or unsuccessful in gaining or maintaining traction of the at least one wheel w of the vehicle 1.

Determining whether or not using the traction control procedure on the surface area 100 is successful or unsuccessful in gaining or maintaining traction of the at least one wheel w of the vehicle 1 may comprise detecting whether or not the vehicle is moving, e.g., longitudinally, by at least a set speed, and/or whether or not the vehicle has moved by a minimum distance since triggering the traction control procedure.

For example, if the vehicle 1 has moved by the set minimum distance since triggering the traction control procedure and/or if the vehicle 1 is travelling by the set speed, the traction control procedure may be considered successful.

Furthermore, if the at least one slipping wheel w is detected to stop slipping or to slip less than a threshold, the traction control procedure may be considered successful.

If the vehicle 1 has moved less than the set minimum distance since triggering the traction control procedure after a set time period such as the procedure duration and/or if the at least one wheel w is still slipping by more than a threshold after the set time period, the traction control procedure may be considered unsuccessful.

Action 207

The method may comprise training the machine learning model based on whether or not the traction control procedure was successful or unsuccessful in gaining traction of the at least one wheel w of the vehicle 1. This type of training may be referred to as reinforcement learning. Training data used for training the machine learning model of examples herein may be based on performing a traction control procedure and adjusting the machine learning model based on the results.

When trained based on successful traction control procedures, the training may cause further determinations, e.g., as in Action 204, using same or similar vehicle status information and/or surface area types, to determine the same or similar traction control procedure.

When trained based on unsuccessful traction control procedures, the training may cause further determinations, e.g., as in Action 204, e.g., using same or similar vehicle status information and/or surface area types, to determine to use another traction control procedure such as by determining to utilize a new blend. The new blend may be determined by any suitable machine learning algorithm, e.g., by randomly and/or in a predefined manner testing different blends.

Figure 3:
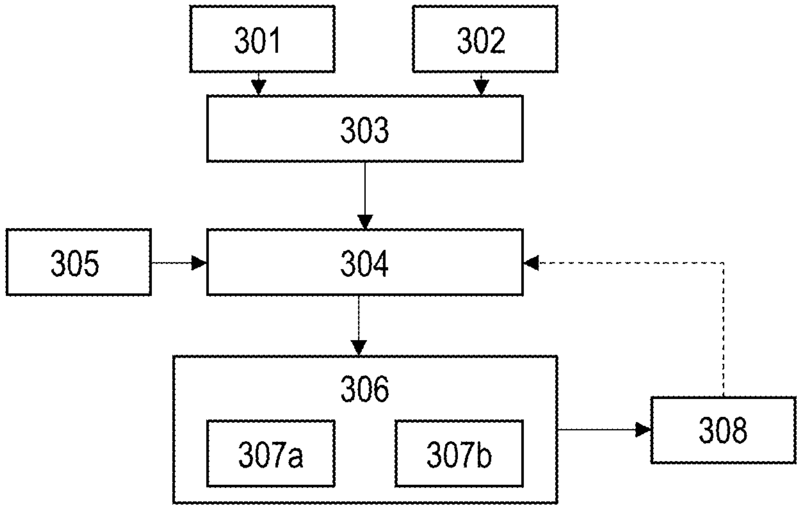
FIG. 3 is a block diagram of an architecture according to an example.

FIG. 3 is a block diagram of an architecture according to an example. The architecture may be seen as abstract units, software units, or hardware units for performing the examples herein.

A surface type determining unit 303, e.g., as part of the computer system 800 and/or the vehicle 1, may determine the surface area type of the surface area 100, e.g., as in Action 202. The surface type determining unit 303 may perform the determination based on sensor data 301 as measured by the one or more sensors 20 and/or CAN signals 302 as obtained from the CAN 60.

A traction determining unit 304, e.g., as part of the computer system 800 and/or the vehicle 1, may determine the traction control procedure to use based at least partly on the determined surface area type, e.g., as in Action 204. The traction determining unit 304 may be a machine learning model, e.g., comprising any suitable neural network or other machine learning model and may be trained as in the above mentioned Actions 201-207.

The traction determining unit 304 may determine the traction control procedure 304 further based on one or more CAN signals 305, e.g., indicative of the vehicle status information and/or wheel information as in the above Actions 201-207.

A traction triggering unit 306, e.g., as part of the computer system 800 and/or the vehicle 1, may trigger the vehicle 1 to perform the traction control procedure, e.g., a brake control procedure 307*a*, a differential locking procedure 307*b*, or a blend of the two, e.g., as in Action 205.

When the traction determining unit 304, in particular a reinforcement learning model, an evaluation unit 308, e.g., as part of the computer system 800 and/or the vehicle 1, may evaluate, e.g., as in Action 206, whether or not the traction control procedure was successful or not in gaining or maintaining traction of the vehicle 1 and may further transmit an associated feedback back to the traction determining unit 304 for training, e.g., as in Action 207, the machine learning model and to adjust the determination procedure accordingly.

Training

The initial machine learning model of examples herein, e.g., the traction determining unit 304 may be initialized with training using vast training data collected from multiple years at different ranges and configurations of any of the parameters of examples herein, e.g., any one or more of vehicle status information, wheel information, and surface area type. This training data may be truth labelled the best starting point of the parameters after extensive driving and tuning.

Learning Methods

Any of the following methods may be used for training machine learning models herein: Linear Regression, Ridge Regression, Neural Network Regression, Lasso Regression, Decision Tree Regression, Random Forest, KNN Model, Support Vector Machines (SVM), Gaussian Regression, Polynomial Regression.

Machine learning models herein may further comprise Recurrent Neural Networks, e.g., using time series data meaning that the training data is time stamped and the training data further includes the time stamp.

Deployment

The trained machine learning model of any example herein may be deployed in a controller onboard the vehicle 1 or on a server-based controller which receives necessary feature data over the air and estimates the parameters.

Reinforcement Learning

When examples herein relate to reinforcement learning, an outcome of the traction control procedure may be monitored. Whether the vehicle 1 is propelled and gained traction as expected or not may be performed by monitoring any one or more out of:

- wheel speeds of the one or more wheels w,
- vehicle speed of the vehicle 1,
- acceleration of the vehicle 1, and
- any other suitable vehicle motion parameter of the vehicle 1 e.g., indicative of longitudinal motion of the vehicle 1.

Figure 4:
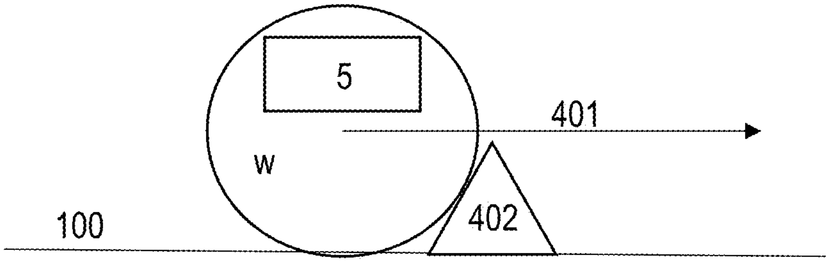
FIG. 4 is a block diagram of a wheel according to an example.

FIG. 4 illustrates a wheel of the one or more wheels w operating on the surface area 100 of a coarse grained surface area type, in particular a muddy surface area type. In this example scenario, there is mud 402 on the surface area 100, and if the wheel, e.g., the at least one wheel of examples above, were to brake according to a brake control procedure it would push the mud instead of rolling over it, potentially building up further mud. Hence, in this example and in similar example scenarios, determining the traction control procedure, e.g., as in Action 204, may comprise determining the traction control procedure to at least partly comprise a differential locking procedure where the wheel would be let to rotate over the mud 402.

Figure 5:
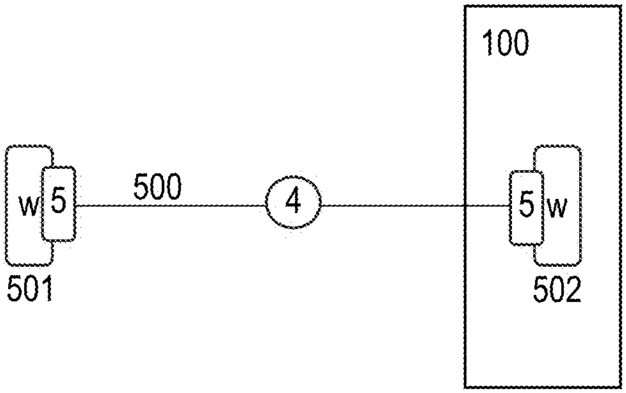
FIG. 5 is a block diagram of two wheels and an axle according to an example.

FIG. 5 is a block diagram of two wheels of the one or more wheels w and an axle 500 of the vehicle 1, e.g., any of the one or more axles 11, 12, 13, according to an example. In this example, the surface area 100 is of a smooth surface area type, in particular an ice surface area type. A first wheel 501 may have traction, and a second wheel 502, e.g., the at least one wheel of examples above, may be slipping on ice of the surface area 100. If performing the differential locking procedure, half of the force will go to both wheels 501, 502, and the second wheel 502 would still be slipping on the ice, resulting in lower traction for the vehicle 1 than if all torque would be used in the first wheel 501. Hence, in this example and in similar example scenarios, determining the traction control procedure, e.g., as in Action 204, may comprise determining the traction control procedure to at least partly comprise a brake control procedure where the second wheel 502 may be braked and let to glide over the ice. Torque may instead be applied to the first wheel 501.

Figure 6:
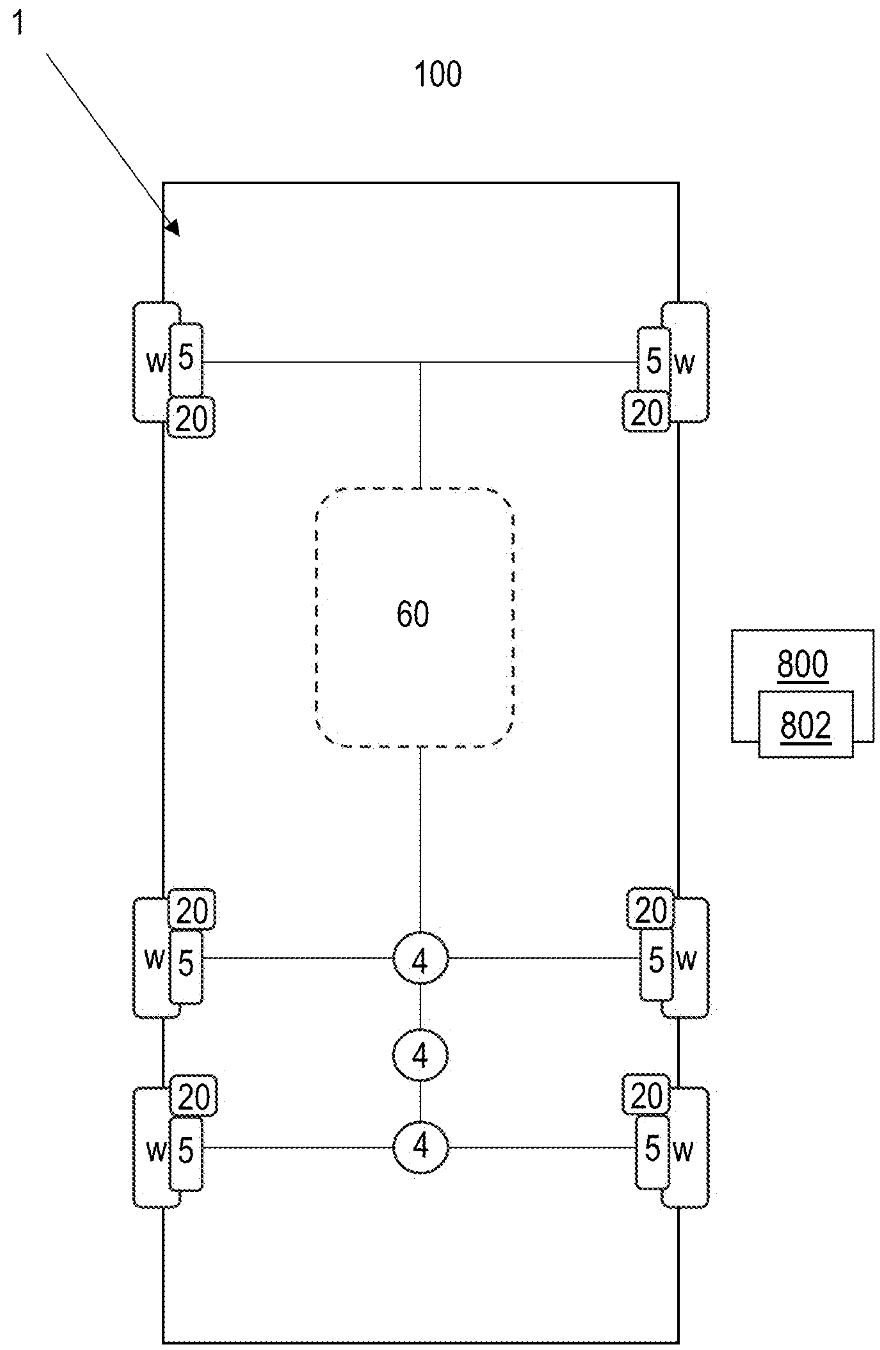
FIG. 6 is another view of FIG. 1, according to an example.

FIG. 6 is another view of FIG. 1, according to an example. The computer system 800 comprising the processing circuitry 802 configured to handle traction control of the vehicle 1 operating on the surface area 100 is provided.

The processing circuitry 802 is configured to, obtain from the one or more sensors 20 of the vehicle 1 and/or from the CAN 60 of the vehicle 1, wheel information indicative of a motion of at least one wheel w of the vehicle 1 operating on the surface area 100.

The processing circuitry 802 is configured to, based on the obtained wheel information, determine the surface area 100 to be of a surface area type out of a set of surface area types.

The processing circuitry 802 is configured to, based on the surface area type, determine a traction control procedure of the vehicle 1. The traction control procedure comprises a brake control procedure, a differential locking procedure, or a blend of the brake control procedure and the differential locking procedure.

The brake control procedure comprises applying a brake force to a slipping wheel of the vehicle 1.

The differential locking procedure comprises locking a differential 4 of an axle of a slipping wheel of the vehicle 1.

The processing circuitry 802 is configured to, trigger the vehicle 1 to perform the determined traction control procedure.

Figure 7:
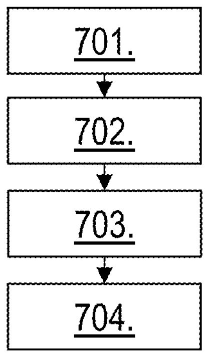
FIG. 7 is a flow chart of an exemplary method according to an example.

FIG. 7 is a flow chart of a method according to an example. A computer-implemented method for handling traction control of the vehicle 1 operating on the surface area 100 is provided.

The method comprises the following actions which may be combined with any of the above or below examples or with the subject matter of the attached claims.

Action 701

The method comprises, by the processing circuitry 802 of the computer system 800, obtaining from the one or more sensors 20 of the vehicle 1 and/or from the CAN 60 of the vehicle 1, wheel information indicative of a motion of at least one wheel w of the vehicle 1 operating on the surface area 100.

Action 702

The method comprises, by the processing circuitry 802, based on the obtained wheel information, determining the surface area 100 to be of a surface area type out of a set of surface area types.

Action 703

The method comprises, by the processing circuitry 802, based on the surface area type, determining a traction control procedure of the vehicle 1. The traction control procedure comprises a brake control procedure, a differential locking procedure, or a blend of the brake control procedure and the differential locking procedure. The brake control procedure comprises applying a brake force to a slipping wheel of the vehicle 1. The differential locking procedure comprises locking a differential 4 of an axle of a slipping wheel of the vehicle 1.

Action 704

The method comprises, by the processing circuitry 802, triggering the vehicle 1 to perform the determined traction control procedure.

Figure 8:
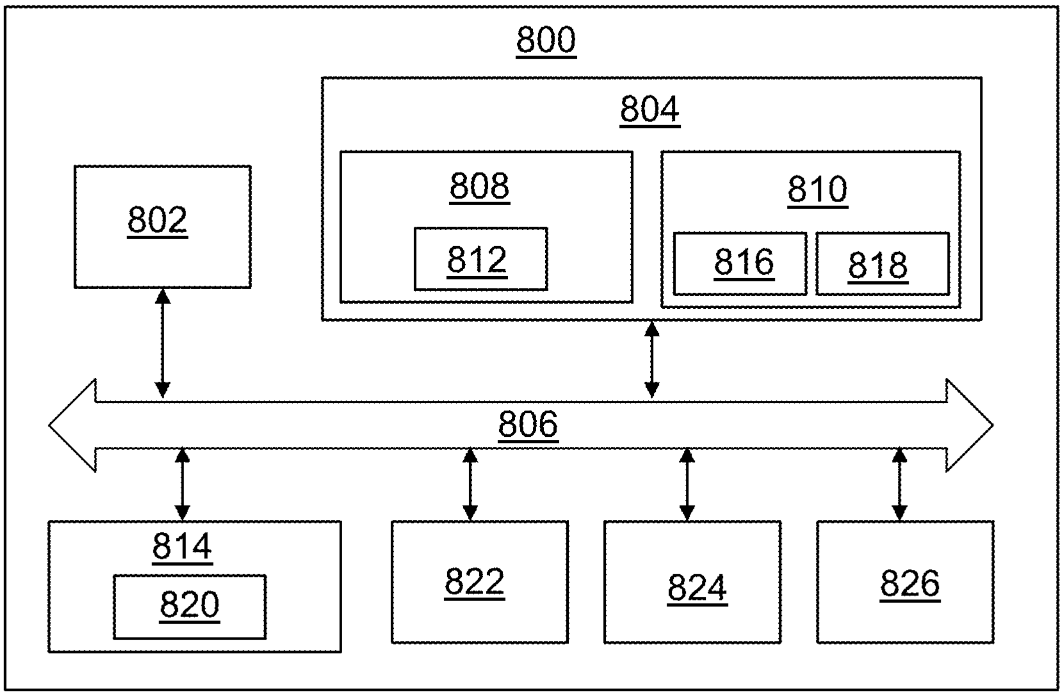
FIG. 8 is a schematic diagram of an exemplary computer system for implementing examples disclosed herein, according to an example.

FIG. 8 is a schematic diagram of a computer system 800 for implementing examples disclosed herein. The computer system 800 is adapted to execute instructions from a computer-readable medium to perform these and/or any of the functions or processing described herein. The computer system 800 may be connected (e.g., networked) to other machines in a LAN (Local Area Network), LIN (Local Interconnect Network), automotive network communication protocol (e.g., FlexRay), an intranet, an extranet, or the Internet. While only a single device is illustrated, the computer system 800 may include any collection of devices that individually or jointly execute a set (or multiple sets) of instructions to perform any one or more of the methodologies discussed herein. Accordingly, any reference in the disclosure and/or claims to a computer system, computing system, computer device, computing device, control system, control unit, electronic control unit (ECU), processor device, processing circuitry, etc., includes reference to one or more such devices to individually or jointly execute a set (or multiple sets) of instructions to perform any one or more of the methodologies discussed herein. For example, control system may include a single control unit or a plurality of control units connected or otherwise communicatively coupled to each other, such that any performed function may be distributed between the control units as desired. Further, such devices may communicate with each other or other devices by various system architectures, such as directly or via a Controller Area Network (CAN) bus, etc.

The computer system 800 may comprise at least one computing device or electronic device capable of including firmware, hardware, and/or executing software instructions to implement the functionality described herein. The computer system 800 may include processing circuitry 802 (e.g., processing circuitry including one or more processor devices or control units), a memory 804, and a system bus 806. The computer system 800 may include at least one computing device having the processing circuitry 802. The system bus 806 provides an interface for system components including, but not limited to, the memory 804 and the processing circuitry 802. The processing circuitry 802 may include any number of hardware components for conducting data or signal processing or for executing computer code stored in memory 804. The processing circuitry 802 may, for example, include a general-purpose processor, an application specific processor, a Digital Signal Processor (DSP), an Application Specific Integrated Circuit (ASIC), a Field Programmable Gate Array (FPGA), a circuit containing processing components, a group of distributed processing components, a group of distributed computers configured for processing, or other programmable logic device, discrete gate or transistor logic, discrete hardware components, or any combination thereof designed to perform the functions described herein. The processing circuitry 802 may further include computer executable code that controls operation of the programmable device.

The system bus 806 may be any of several types of bus structures that may further interconnect to a memory bus (with or without a memory controller), a peripheral bus, and/or a local bus using any of a variety of bus architectures. The memory 804 may be one or more devices for storing data and/or computer code for completing or facilitating methods described herein. The memory 804 may include database components, object code components, script components, or other types of information structure for supporting the various activities herein. Any distributed or local memory device may be utilized with the systems and methods of this description. The memory 804 may be communicably connected to the processing circuitry 802 (e.g., via a circuit or any other wired, wireless, or network connection) and may include computer code for executing one or more processes described herein. The memory 804 may include non-volatile memory 808 (e.g., read-only memory (ROM), erasable programmable read-only memory (EPROM), electrically erasable programmable read-only memory (EEPROM), etc.), and volatile memory 810 (e.g., random-access memory (RAM)), or any other medium which can be used to carry or store desired program code in the form of machine-executable instructions or data structures and which can be accessed by a computer or other machine with processing circuitry 802. A basic input/output system (BIOS) 812 may be stored in the non-volatile memory 808 and can include the basic routines that help to transfer information between elements within the computer system 800.

The computer system 800 may further include or be coupled to a non-transitory computer-readable storage medium such as the storage device 814, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 814 and other drives associated with computer-readable media and computer-usable media may provide non-volatile storage of data, data structures, computer-executable instructions, and the like.

Computer-code which is hard or soft coded may be provided in the form of one or more modules. The module(s) can be implemented as software and/or hard-coded in circuitry to implement the functionality described herein in whole or in part. The modules may be stored in the storage device 814 and/or in the volatile memory 810, which may include an operating system 816 and/or one or more program modules 818. All or a portion of the examples disclosed herein may be implemented as a computer program 820 stored on a transitory or non-transitory computer-usable or computer-readable storage medium (e.g., single medium or multiple media), such as the storage device 814, which includes complex programming instructions (e.g., complex computer-readable program code) to cause the processing circuitry 802 to carry out actions described herein. Thus, the computer-readable program code of the computer program 820 can comprise software instructions for implementing the functionality of the examples described herein when executed by the processing circuitry 802. In some examples, the storage device 814 may be a computer program product (e.g., readable storage medium) storing the computer program 820 thereon, where at least a portion of a computer program 820 may be loadable (e.g., into a processor) for implementing the functionality of the examples described herein when executed by the processing circuitry 802. The processing circuitry 802 may serve as a controller or control system for the computer system 800 that is to implement the functionality described herein.

The computer system 800 may include an input device interface 822 configured to receive input and selections to be communicated to the computer system 800 when executing instructions, such as from a keyboard, mouse, touch-sensitive surface, etc. Such input devices may be connected to the processing circuitry 802 through the input device interface 822 coupled to the system bus 806 but can be connected through other interfaces, such as a parallel port, an Institute of Electrical and Electronic Engineers (IEEE) 1394 serial port, a Universal Serial Bus (USB) port, an IR interface, and the like. The computer system 800 may include an output device interface 824 configured to forward output, such as to a display, a video display unit (e.g., a liquid crystal display (LCD) or a cathode ray tube (CRT)). The computer system 800 may include a communications interface 826 suitable for communicating with a network as appropriate or desired.

The operational actions described in any of the exemplary aspects herein are described to provide examples and discussion. The actions may be performed by hardware components, may be embodied in machine-executable instructions to cause a processor to perform the actions, or may be performed by a combination of hardware and software. Although a specific order of method actions may be shown or described, the order of the actions may differ. In addition, two or more actions may be performed concurrently or with partial concurrence.

Below follows a list of Examples 1-20 where each respective example may be combined with any of the above examples or subject matter of the attached claims.

Example 1

A computer system (800) comprising processing circuitry (802) configured to handle traction control of a vehicle operating on a surface area (100), the processing circuitry (802) being configured to:

obtain from one or more sensors of the vehicle (1) and/or from a controller area network (CAN) (60) of the vehicle (1), wheel information indicative of a motion of at least one wheel (w) of the vehicle (1) operating on the surface area (100), based on the obtained wheel information, determine the surface area (100) to be of a surface area type out of a set of surface area types, and based on the surface area type, determine a traction control procedure of the vehicle (1), wherein the traction control procedure comprises a brake control procedure, a differential locking procedure, or a blend of the brake control procedure and the differential locking procedure, wherein the brake control procedure comprises applying a brake force to a slipping wheel of the vehicle (1), and where the differential locking procedure comprises locking a differential (4) of an axle of a slipping wheel of the vehicle (1); and trigger the vehicle (1) to perform the determined traction control procedure.

Example 2

The computer system (800) of Example 1, wherein the processing circuitry (802) is configured to:

obtain vehicle status information from the one or more sensors of the vehicle (1) and/or from the CAN (60) of the vehicle (1), the vehicle status information being indicative of any one or more of:

a motion of the vehicle (1), environmental data of the surface area (100) and/or the vehicle (1), load applied to one or more axles of the vehicle (1), steering information of the vehicle (1), characteristics of the vehicle (1), or user input; and determine the traction control procedure based on the obtained vehicle status information.

Example 3

The computer system (800) of Example 1 or 2, wherein the processing circuitry (802) is configured to determine the traction control procedure based on a machine learning model, wherein the machine learning model is trained based on one or more training vehicles using the brake control procedure, the differential locking procedure, or a blend of the brake control procedure and the differential locking procedure when a respective wheel of a respective training vehicle is slipping in a respective surface area type of the set of surface area types, and wherein the machine learning model is trained on the corresponding outcome of whether the respective training vehicle was successful or unsuccessful in gaining traction of the respective slipping wheel.

Example 4

The computer system (800) of Example 3, wherein the machine learning model is a reinforcement learning model, and wherein the processing circuitry (802) is further configured to determine whether or not using the traction control procedure on the surface area (100) is successful or unsuccessful in gaining or maintaining traction of the at least one wheel (w) of the vehicle (1), and wherein the machine learning model is trained on whether or not the traction control procedure was successful or unsuccessful in gaining traction of the at least one wheel (w) of the vehicle (1).

Example 5

The computer system (800) of Example 3 or 4, wherein the machine learning model is further trained on vehicle status information indicative of any one or more of:

a motion of the vehicle (1), environmental data of the surface area (100) and/or the vehicle (1), load applied to one or more axles of the vehicle (1), steering information of the vehicle (1), characteristics of the vehicle (1), or user input.

Example 6

The computer system (800) of any of Examples 1-5, wherein the processing circuitry (802) is configured to determine the surface area type based on determining a current slip of the at least one wheel (w) of the vehicle (1) and mapping the current slip to the surface area type.

Example 7

The computer system (800) of any of Examples 1-6, wherein the wheel information comprises accelerometer data of the at least one wheel (w), and wherein the processing circuitry (802) is configured to determine the surface area type based on the accelerometer data.

Example 8

The computer system (800) of any of Examples 1-7, wherein the set of surface area types comprises a smooth surface area type.

Example 9

The computer system (800) of any of Examples 1-8, wherein the set of surface area types comprises a coarse grained surface area type.

Example 10

The computer system (800) of any of Examples 1-9, wherein the blend of the brake control procedure and the differential locking procedure comprises a sequence of switching between performing the brake control procedure and the differential locking procedure.

Example 11

A vehicle (1) comprising, or is controlled by, a computer system (800) of any of Examples 1-10.

Example 12

A computer-implemented method for handling traction control of a vehicle (1) operating on a surface area (100), the method comprising:

- by processing circuitry (802) of a computer system (800), obtaining (201, 701) from one or more sensors of the vehicle (1) and/or from a Controller Area Network (CAN) (60) of the vehicle (1), wheel information indicative of a motion of at least one wheel (w) of the vehicle (1) operating on the surface area (100),
- by the processing circuitry (802), based on the obtained wheel information, determining (202, 702) the surface area (100) to be of a surface area type out of a set of surface area types,
- by the processing circuitry (802), based on the surface area type, determining (204, 703) a traction control procedure of the vehicle (1), wherein the traction control procedure comprises a brake control procedure, a differential locking procedure, or a blend of the brake control procedure and the differential locking procedure,
  - wherein the brake control procedure comprises applying a brake force to a slipping wheel of the vehicle (1), and
  - where the differential locking procedure comprises locking a differential (4) of an axle of a slipping wheel of the vehicle (1); and
- by the processing circuitry (802), triggering (205, 704) the vehicle (1) to perform the determined traction control procedure.

Example 13

The method of Example 12, wherein the method further comprises:

- obtaining (203) vehicle status information from the one or more sensors of the vehicle (1) and/or from the CAN (60) of the vehicle (1), the vehicle status information being indicative of any one or more of:
  - a motion of the vehicle (1),
  - environmental data of the surface area (100) and/or the vehicle (1),
  - load applied to one or more axles of the vehicle (1),
  - steering information of the vehicle (1),
  - characteristics of the vehicle (1), or
  - user input; and
- determining the traction control procedure is based on the obtained vehicle status information.

Example 14

The method of Example 12 or 13, wherein determining the traction control procedure is based on a machine learning model, wherein the machine learning model is trained based on one or more training vehicles using the brake control procedure, the differential locking procedure, or a blend of the brake control procedure and the differential locking procedure when a respective wheel of a respective training vehicle is slipping in a respective surface area type of the set of surface area types, and wherein the machine learning model is trained on the corresponding outcome of whether the respective training vehicle was successful or unsuccessful in gaining traction of the respective slipping wheel.

Example 15

The method of Example 14, wherein the machine learning model is a reinforcement learning model, and wherein the method further comprises determining 206 whether or not using the traction control procedure on the surface area (100) is successful or unsuccessful in gaining or maintaining traction of the at least one wheel (w) of the vehicle (1), and training (207) the machine learning model based on whether or not the traction control procedure was successful or unsuccessful in gaining traction of the at least one wheel (w) of the vehicle (1).

Example 16

The method of any of Examples 12-15, wherein the machine learning model is further trained on vehicle status information indicative of any one or more of:

- a motion of the vehicle (1),
- environmental data of the surface area (100) and/or the vehicle (1),
- load applied to one or more axles of the vehicle (1),
- steering information of the vehicle (1),
- characteristics of the vehicle (1), or
- user input.

Example 17

The method of any of Examples 12-16, wherein determining the surface area type is based on determining a current slip of the at least one wheel (w) of the vehicle (1) and mapping the current slip to the surface area type; and/or where determining the surface area type is based on accelerometer data, wherein the accelerometer data is part of the wheel information.

Example 18

The method of any of Examples 12-17, wherein the set of surface area types comprises a smooth surface area type, and wherein the set of surface area types comprises a coarse grained surface area type.

Example 19

A computer program product comprising program code for performing, when executed by the processing circuitry (802), the method of any of Examples 12-17.

Example 20

A non-transitory computer-readable storage medium comprising instructions, which when executed by the processing circuitry (802), cause the processing circuitry (802) to perform the method of any of Examples 12-17.

The terminology used herein is for the purpose of describing particular aspects only and is not intended to be limiting of the disclosure. As used herein, the singular forms “a,” “an,” and “the” are intended to include the plural forms as well, unless the context clearly indicates otherwise. As used herein, the term "and/or" includes any and all combinations of one or more of the associated listed items. It will be further understood that the terms "comprises," "comprising," "includes," and/or "including" when used herein specify the presence of stated features, integers, actions, steps, operations, elements, and/or components, but do not preclude the presence or addition of one or more other features, integers, actions, steps, operations, elements, components, and/or groups thereof.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element without departing from the scope of the present disclosure.

Relative terms such as "below" or "above" or "upper" or "lower" or "horizontal" or "vertical" may be used herein to describe a relationship of one element to another element as illustrated in the Figures. It will be understood that these terms and those discussed above are intended to encompass different orientations of the device in addition to the orientation depicted in the Figures. It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which this disclosure belongs. It will be further understood that terms used herein should be interpreted as having a meaning consistent with their meaning in the context of this specification and the relevant art and will not be interpreted in an idealized or overly formal sense unless expressly so defined herein.

It is to be understood that the present disclosure is not limited to the aspects described above and illustrated in the drawings; rather, the skilled person will recognize that many changes and modifications may be made within the scope of the present disclosure and appended claims. In the drawings and specification, there have been disclosed aspects for purposes of illustration only and not for purposes of limitation, the scope of the disclosure being set forth in the following claims.

What is claimed is:

1. A computer system comprising processing circuitry configured to handle traction control of a vehicle operating on a surface area, the processing circuitry being configured to:

obtain from one or more sensors of the vehicle and/or from a controller area network (CAN) of the vehicle, wheel information indicative of a motion of at least one wheel of the vehicle operating on the surface area, based on the obtained wheel information, determine the surface area to be of a surface area type out of a set of surface area types, and based on the surface area type, determine a traction control procedure of the vehicle, wherein the traction control procedure comprises a brake control procedure, a differential locking procedure, or a blend of the brake control procedure and the differential locking procedure, wherein the brake control procedure comprises applying a brake force to a slipping wheel of the vehicle, and where the differential locking procedure comprises locking a differential of an axle of a slipping wheel of the vehicle;

wherein determining the traction control procedure comprises selecting which of the brake control procedure, the differential locking procedure, or the blend of the brake control procedure and the differential locking procedure to use, and trigger the vehicle to perform the determined traction control procedure.

2. The computer system of claim 1, wherein the processing circuitry is configured to:

obtain vehicle status information from the one or more sensors of the vehicle and/or from the CAN of the vehicle, the vehicle status information being indicative of any one or more of:

a motion of the vehicle, environmental data of the surface area and/or the vehicle, load applied to one or more axles of the vehicle, steering information of the vehicle, characteristics of the vehicle, or user input; and determine the traction control procedure based on the obtained vehicle status information.

3. The computer system of claim 1, wherein the processing circuitry is configured to determine the traction control procedure based on a machine learning model, wherein the machine learning model is trained based on one or more training vehicles using the brake control procedure, the differential locking procedure, or a blend of the brake control procedure and the differential locking procedure when a respective wheel of a respective training vehicle is slipping in a respective surface area type of the set of surface area types, and wherein the machine learning model is trained on the corresponding outcome of whether the respective training vehicle was successful or unsuccessful in gaining traction of the respective slipping wheel.

4. The computer system of claim 3, wherein the machine learning model is a reinforcement learning model, and wherein the processing circuitry is further configured to determine whether or not using the traction control procedure on the surface area is successful or unsuccessful in gaining or maintaining traction of the at least one wheel of the vehicle, and wherein the machine learning model is trained on whether or not the traction control procedure was successful or unsuccessful in gaining traction of the at least one wheel of the vehicle.

5. The computer system of claim 3, wherein the machine learning model is further trained on vehicle status information indicative of any one or more of:

a motion of the vehicle, environmental data of the surface area and/or the vehicle, load applied to one or more axles of the vehicle, steering information of the vehicle, characteristics of the vehicle, or user input.

6. The computer system of claim 1, wherein the processing circuitry is configured to determine the surface area type based on determining a current slip of the at least one wheel of the vehicle and mapping the current slip to the surface area type.

7. The computer system of claim 1, wherein the wheel information comprises accelerometer data of the at least one wheel, and wherein the processing circuitry is configured to determine the surface area type based on the accelerometer data.

8. The computer system of claim 1, wherein the set of surface area types comprises a smooth surface area type.

9. The computer system of claim 1, wherein the set of surface area types comprises a coarse grained surface area type.

10. The computer system of claim 1, wherein the blend of the brake control procedure and the differential locking procedure comprises a sequence of switching between performing the brake control procedure and the differential locking procedure.

11. A vehicle comprising, or is controlled by, a computer system of claim 1.

12. A computer-implemented method for handling traction control of a vehicle operating on a surface area, the method comprising:

by processing circuitry of a computer system, obtaining from one or more sensors of the vehicle and/or from a Controller Area Network (CAN) of the vehicle, wheel information indicative of a motion of at least one wheel of the vehicle operating on the surface area, by the processing circuitry, based on the obtained wheel information, determining the surface area to be of a surface area type out of a set of surface area types, by the processing circuitry, based on the surface area type, determining a traction control procedure of the vehicle, wherein the traction control procedure comprises a brake control procedure, a differential locking procedure, or a blend of the brake control procedure and the differential locking procedure, wherein the brake control procedure comprises applying a brake force to a slipping wheel of the vehicle, and where the differential locking procedure comprises locking a differential of an axle of a slipping wheel of the vehicle;

wherein determining the traction control procedure comprises selecting which of the brake control procedure, the differential locking procedure, or the blend of the brake control procedure and the differential locking procedure to use, and by the processing circuitry, triggering the vehicle to perform the determined traction control procedure.

13. The method of claim 12, wherein the method further comprises:

obtaining vehicle status information from the one or more sensors of the vehicle and/or from the CAN of the vehicle, the vehicle status information being indicative of any one or more of:

a motion of the vehicle, environmental data of the surface area and/or the vehicle, load applied to one or more axles of the vehicle, steering information of the vehicle, characteristics of the vehicle, or user input; and determining the traction control procedure is based on the obtained vehicle status information.

14. The method of claim 12, wherein determining the traction control procedure is based on a machine learning model, wherein the machine learning model is trained based on one or more training vehicles using the brake control procedure, the differential locking procedure, or a blend of the brake control procedure and the differential locking procedure when a respective wheel of a respective training vehicle is slipping in a respective surface area type of the set of surface area types, and wherein the machine learning model is trained on the corresponding outcome of whether the respective training vehicle was successful or unsuccessful in gaining traction of the respective slipping wheel.

15. The method of claim 14, wherein the machine learning model is a reinforcement learning model, and wherein the method further comprises determining whether or not using the traction control procedure on the surface area is successful or unsuccessful in gaining or maintaining traction of the at least one wheel of the vehicle, and training the machine learning model based on whether or not the traction control procedure was successful or unsuccessful in gaining traction of the at least one wheel of the vehicle.

16. The method of claim 12, wherein the machine learning model is further trained on vehicle status information indicative of any one or more of:

a motion of the vehicle, environmental data of the surface area and/or the vehicle, load applied to one or more axles of the vehicle, steering information of the vehicle, characteristics of the vehicle, or user input.

17. The method of claim 12, wherein determining the surface area type is based on determining a current slip of the at least one wheel of the vehicle and mapping the current slip to the surface area type; and/or where determining the surface area type is based on accelerometer data, wherein the accelerometer data is part of the wheel information.

18. The method of claim 12, wherein the set of surface area types comprises a smooth surface area type, and wherein the set of surface area types comprises a coarse grained surface area type.

19. A non-transitory computer-readable storage medium comprising instructions, which when executed by the processing circuitry, cause the processing circuitry to perform the method of claim 12.

* * * * *